(12) United States Patent
Chang

(10) Patent No.: US 6,742,223 B1
(45) Date of Patent: Jun. 1, 2004

(54) CLAMPING DEVICE FOR STORING BUNDLED ITEMS

(76) Inventor: Chun Yuan Chang, P.O. Box 63-99, Taichung (TW), 406

( * ) Notice: Subject to any disclaimer, the term of this patent is extended or adjusted under 35 U.S.C. 154(b) by 0 days.

(21) Appl. No.: 10/354,851

(22) Filed: Jan. 28, 2003

(51) Int. Cl.[7] .......................... A44B 21/00; B65D 63/00
(52) U.S. Cl. ........................ 24/16 R; 24/16 PB; 24/18; 24/30.5 R; 24/130; 24/279; 24/543
(58) Field of Search .............................. 24/16 R, 305 R, 24/543, 130, 18, 274 WB, 279, 16 PB

(56) References Cited

U.S. PATENT DOCUMENTS

| | | | | |
|---|---|---|---|---|
| 1,401,854 A | * | 12/1921 | Almedia | 24/30.5 R |
| 1,646,463 A | * | 10/1927 | Stokesberry | 24/273 |
| 2,750,645 A | * | 6/1956 | Seltzer | 24/279 |
| 3,809,371 A | * | 5/1974 | Martini | 24/543 |
| 4,300,270 A | * | 11/1981 | Sauer | 24/274 R |
| 4,881,301 A | * | 11/1989 | Sweeney et al. | 24/30.5 R |
| 4,935,992 A | * | 6/1990 | Due | 24/16 R |
| 5,323,517 A | * | 6/1994 | Su | 24/517 |
| 5,729,872 A | | 3/1998 | Ginocchio | 24/16 R |
| 6,101,684 A | * | 8/2000 | Ginocchio | 24/16 R |
| 6,266,852 B1 | * | 7/2001 | Tai | 24/16 PB |

* cited by examiner

*Primary Examiner*—Victor Sakran

(57) ABSTRACT

A clamping device includes two jaws each having a hinge end pivotally secured together with a pivot shaft. One of the jaws includes a distal attachment end having a number of teeth, and the other jaw includes a distal attachment end having a pivotal pawl which has a catch biased to engage with either of the teeth of the jaw, and to detachably or openably secure the attachment ends of the jaws together. A spring may bias the catch of the pawl to engage with either of the teeth. A housing may further be secured to the jaw to shield the teeth or the pawl, and to prevent the pawl from being disengaged from the teeth inadvertently.

5 Claims, 4 Drawing Sheets

CLAMPING DEVICE FOR STORING BUNDLED ITEMS

BACKGROUND OF THE INVENTION

1. Field of the Invention

The present invention relates to a clamping device, and more particularly to a clamping device for clamping and storing bundled items, or cables.

2. Description of the Prior Art

Various kinds of typical clamping devices have been developed for clamping or storing elongated items, such as electrical cords or cables.

One of the examples of the typical clamping devices has been developed and disclosed in U.S. Pat. No. 5,729,872 to Ginocchio and comprises a handcuff-like element having two pawls to fix or to clamp the electrical cords or cables therein. One of the jaws includes a number of teeth to be engaged in a passage of the other jaw, and to be engaged with a tang of the other jaw. However, the tang is formed integral on the other jaw and may not be suitably molded or formed on the other jaw.

For example, if the materials to form the jaws are stronger or include stronger stiffness, the jaws may not be easily removed from the molds, and tang may be easily bent or disengaged from the jaw while in use. On the contrary, if the materials to form the jaws are softer or weak, or include less stiffness, the tang is not strong enough and may not be solidly engaged with the teeth of the other jaw, such that the items may not be solidly secured or clamped and retained between the jaws.

The present invention has arisen to mitigate and/or obviate the afore-described disadvantages of the conventional clamping devices.

SUMMARY OF THE INVENTION

The primary objective of the present invention is to provide a clamping device including a stronger configuration to stably and solidly clamp and store bundled items, cables, electrical cords, or the like therein.

In accordance with one aspect of the invention, there is provided a clamping device comprising a first jaw and a second jaw each including a hinge end and a distal attachment end, the hinge ends of the first and the second jaws are pivotally secured together with such as a pivot shaft, the attachment end of the first jaw includes a plurality of teeth provided thereon, the attachment end of the second jaw includes a pawl pivotally attached thereto, the pawl includes a catch for engaging with either of the teeth of the first jaw, to detachably secure the attachment ends of the first and the second jaws together. A spring may further be provided for biasing the catch of the pawl to engage with either of the teeth of the first jaw, and thus to detachably secure the jaws together, and to clamp or retain objects or bundled items between the jaws.

The attachment end of the second jaw includes a pivot pin attached thereto and engaged through the pawl to pivotally secure the pawl to the attachment end of the second jaw. For example, the attachment end of the second jaw includes a channel formed and defined between a pair of arms to receive the pawl in the channel of the attachment end of the second jaw.

The spring may be a coil spring and may be engaged on the pivot pin, and may have two ends engaged with the second jaw and the pawl respectively, for biasing the catch of the pawl to engage with the teeth of the first jaw.

The attachment end of the first jaw includes a housing secured thereon by such as welding processes, and having a passage formed therein to receive the attachment end of the second jaw. The first jaw includes a fastener engaged through the housing and the attachment end of the first jaw, to secure the attachment end of the first jaw and the housing together. The housing includes an opening formed therein and communicating with the passage thereof to receive the attachment end of the second jaw.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
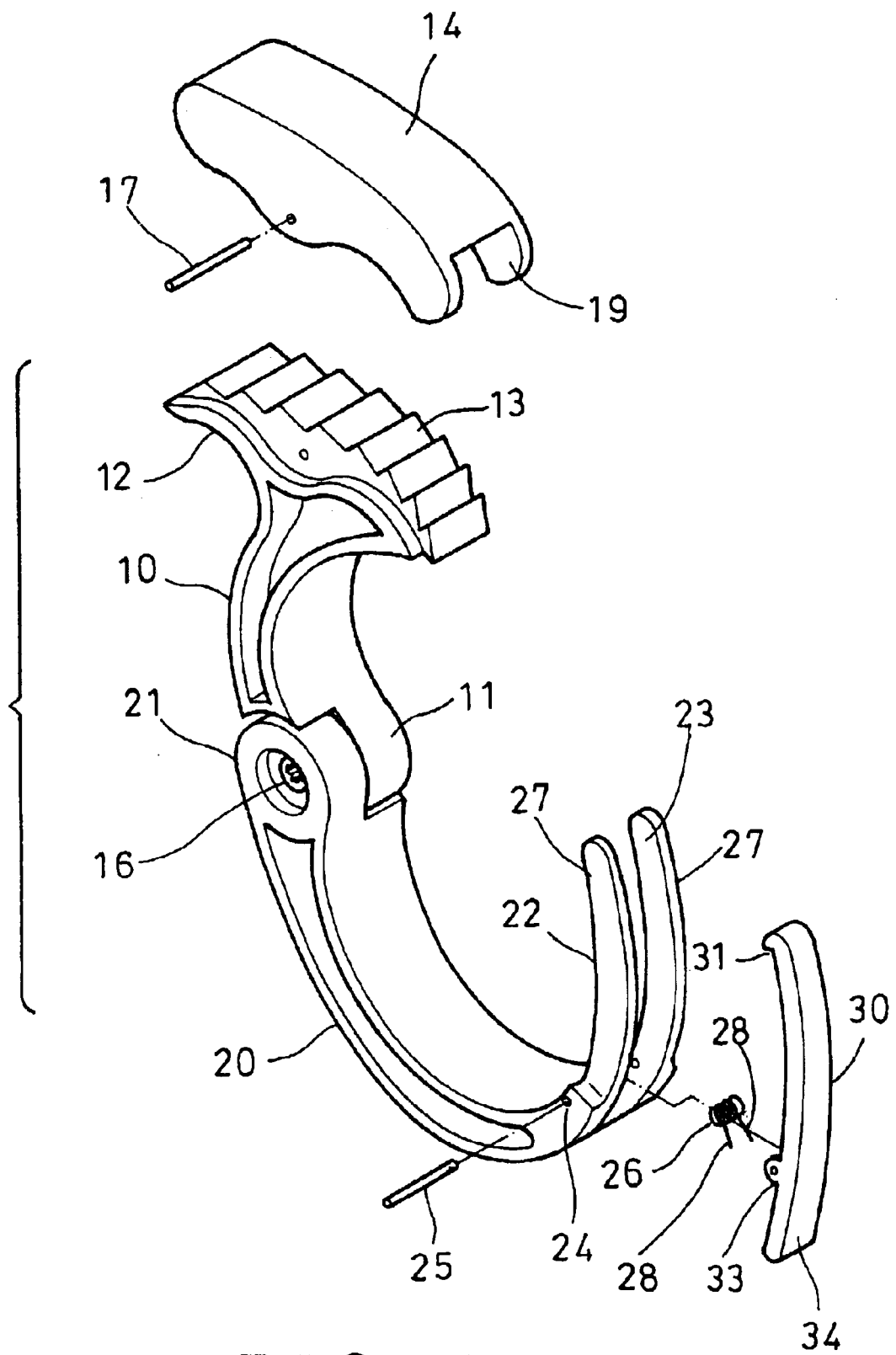
FIG. 1 is an exploded view of a clamping device in accordance with the present invention.
Figure 2:
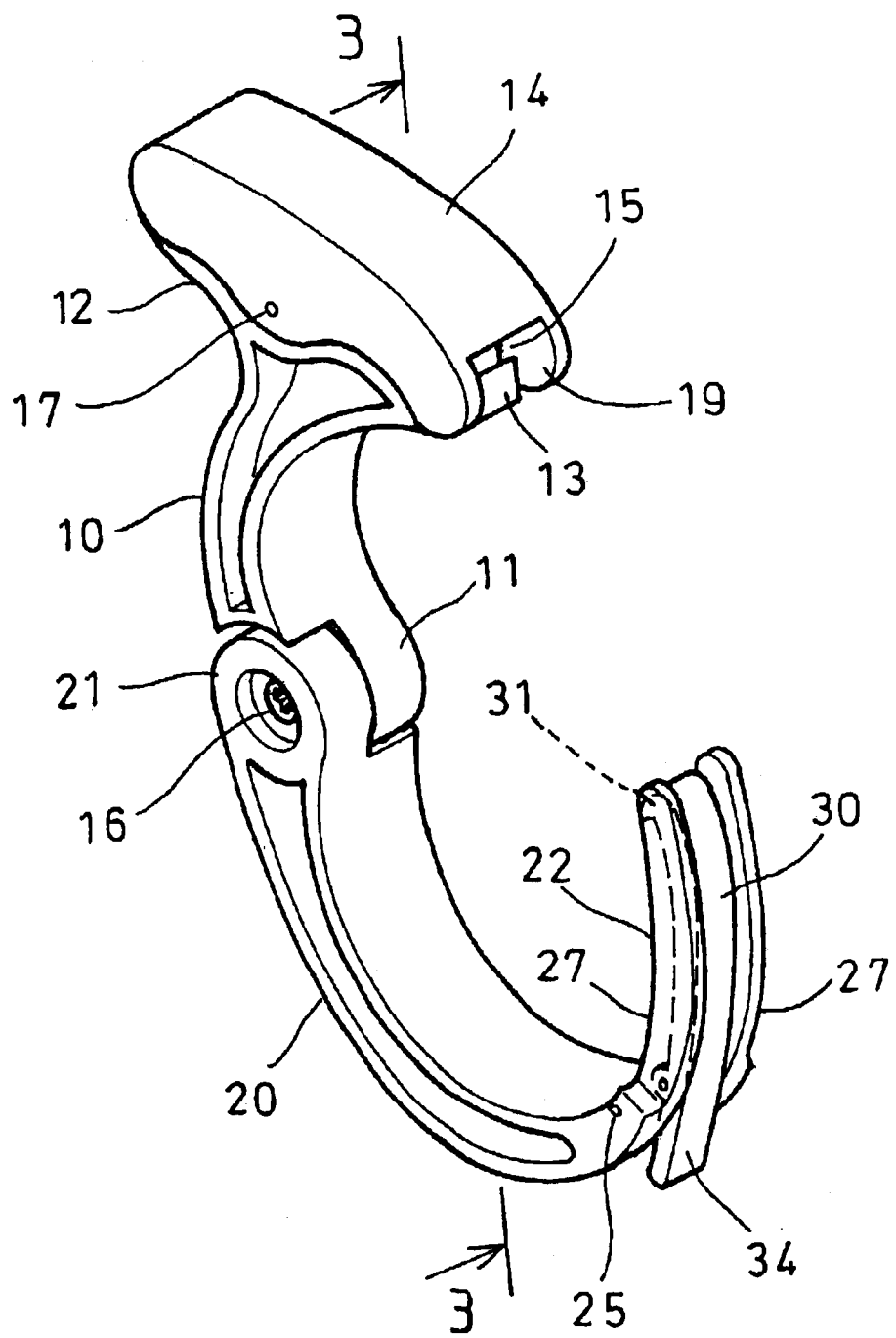
FIG. 2 is a perspective view of the clamping device, which is arranged in an open position.
Figure 3:
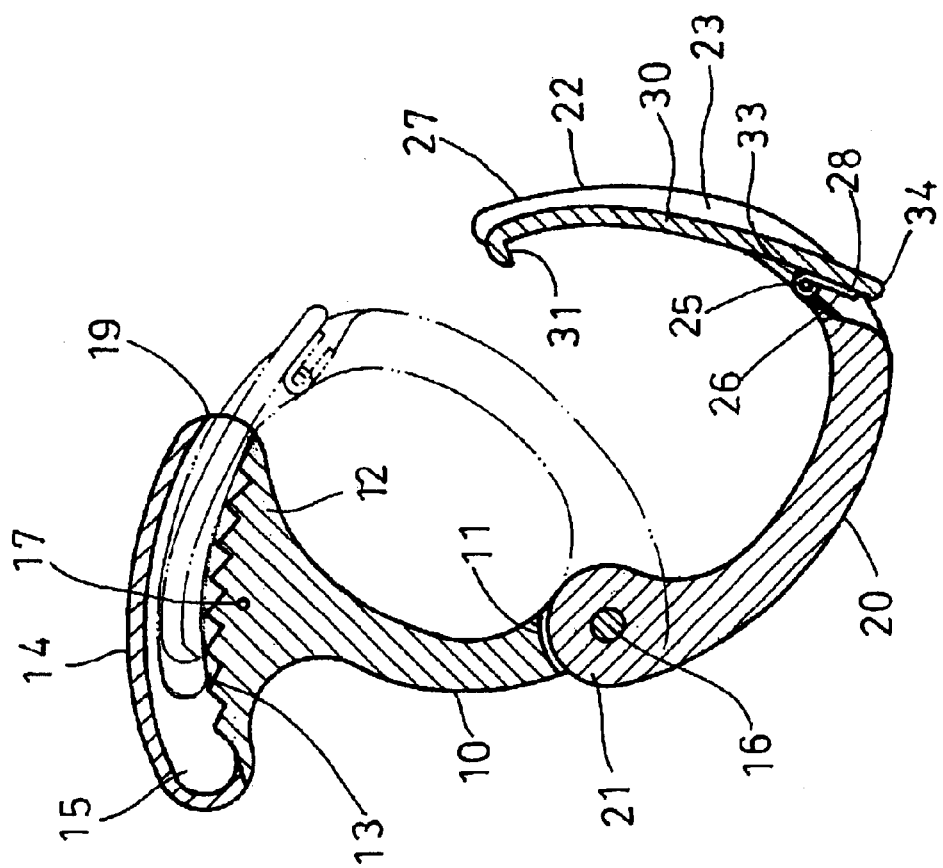
FIG. 3 is a cross sectional view of the clamping device, taken along lines 3—3 of FIG. 2.

Referring to the drawings, and initially to FIGS. 1–3, a clamping device in accordance with the present invention comprises two jaws 10, 20 each having a proximal hinge end 11, 21 respectively, and a distal attachment end 12, 22 respectively. For example, the hinge ends 11, 21 of the jaws 10, 20 are rotatably or pivotally secured together with a pivot shaft 16.

The other end or the attachment end 12 of the jaw 10 includes a number of teeth 13 formed or provided thereon. The attachment end 22 of the other jaw 20 includes a pawl 30 having a hook or a catch 31 provided thereon, for engaging with either of the teeth 13 of the jaw 10, and for detachably or openably securing the attachment ends 12, 22 of the jaws 10, 20 together.

For example, the attachment end 22 of the other jaw 20 includes a channel 23 formed therein and defined between two legs or arms 27, and includes an aperture 24 formed therein to receive a pivot pin 25 therein. The pivot pin 25 is engaged through the arms 27 and the channel 23 of the jaw 20.

The pawl 30 is movably or rotatably received in the channel 23 of the attachment end 22 of the other jaw 20, and includes one end or middle portion 33 pivotally or rotatably engaged onto the pivot pin 25, for allowing the pawl 30 to be pivotally or rotatably secured to the jaw 20. The hook or catch 31 is provided on the other end of the pawl 30, for engaging with either of the teeth 13 of the jaw 10.

A spring 26 is engaged or biased between the jaw 20 and the pawl 30, for biasing the catch 31 of the pawl 30 to engage with the teeth 13 of the jaw 10. For example, the spring 26 is a coil spring engaged onto the pivot pin 25, and includes two ends 28 engaged with the jaw 20 and the pawl 30 respectively, for biasing the other end or the catch 31 of the pawl 30 to engage with the teeth 13 of the jaw 10, best shown in FIGS. 4 and 5.

Figure 5:
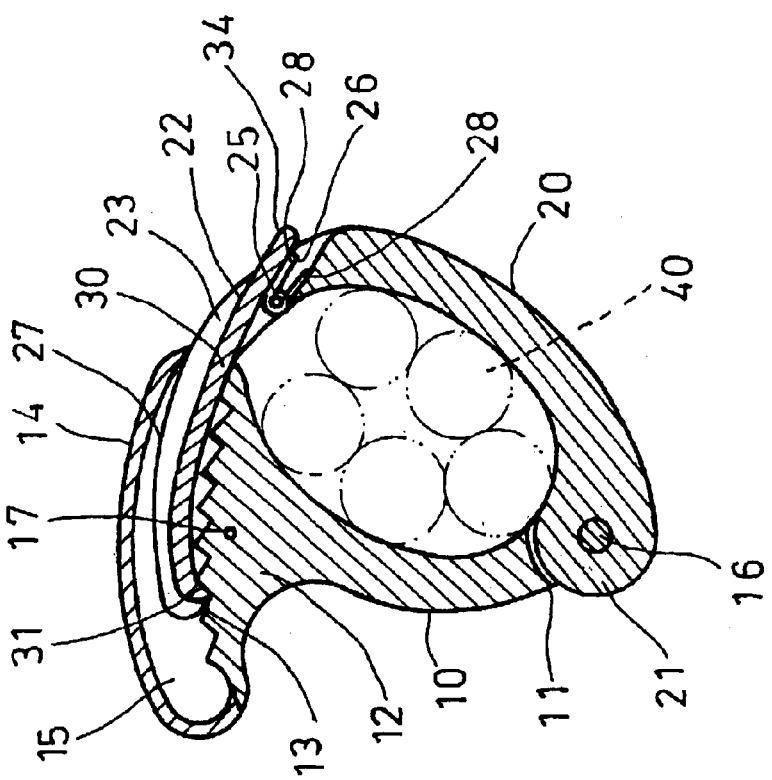
FIG. 5 is a cross sectional view of the clamping device, taken along lines 5—5 of FIG. 4, illustrating the operation of the clamping device.
Figure 4:
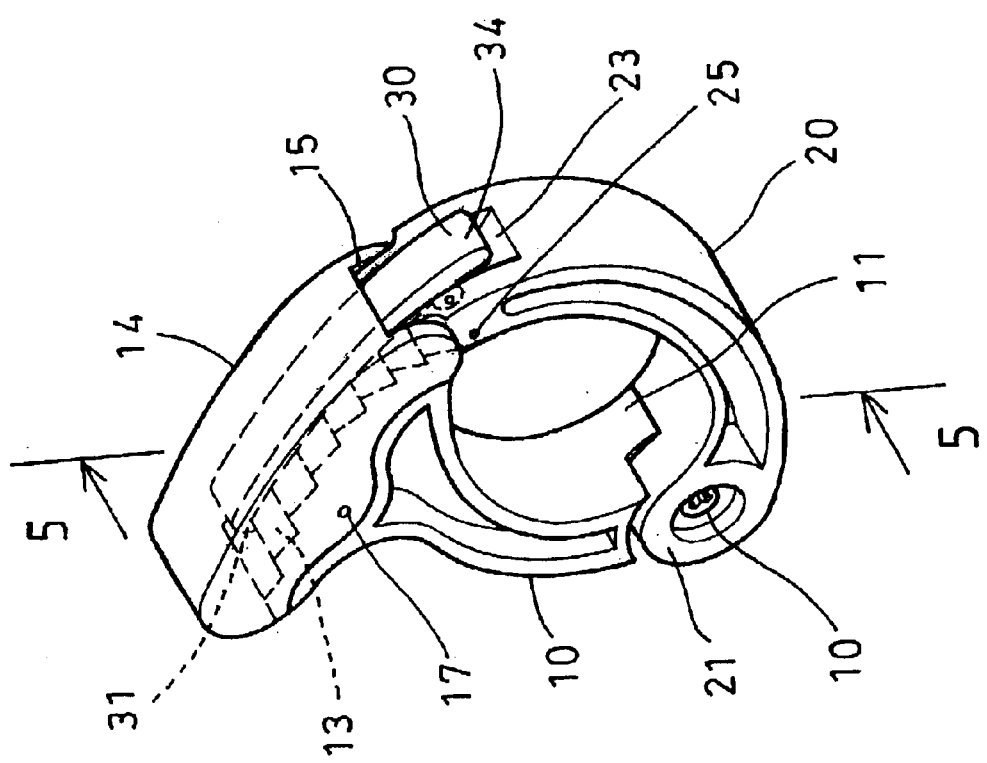
FIG. 4 is a perspective view of the clamping device, which is arranged in a closed position.

In operation, as shown in FIGS. 4 and 5, various objects 40, such as bundled items, cables, electrical cords, or the like may be stably and solidly clamped and stored between the jaws 10, 20 when the catch 31 of the pawl 30 is engaged with either of the teeth 13 of the jaw 10, to detachably or openably or solidly secure the attachment ends 12, 22 of the jaws 10, 20 together.

When it is required to release the bundled items or objects 40, it is only required to depress the other end 34 of the pawl 30 against the spring 26, in order to disengage the catch 31 of the pawl 30 from the teeth 13 of the jaw 10, the attachment ends 12, 22 of the jaws 10, 20 may thus be easily and quickly disengaged and separated from each other to release the objects 40.

It is to be noted that the pawl 30 may be manufactured or formed separately from the jaw 20, and thus may be made of stronger materials than that for the jaws 10, 20. The teeth 13 of the jaw 10, and/or the catch 31 of the pawl 30 may preferably be formed as ratchet teeth structure, for allowing the catch 31 of the pawl 30 to solidly engage with the teeth 13 of the jaw 10, and thus to solidly secure the jaws 10, 20 together, and to solidly retain the objects or bundled items 40 between the jaws 10, 20.

As shown in the drawings, a housing 14 may further be provided and secured to the attachment end 12 of the jaw 10 with a fastener 17, or by welding processes, to form or define a passage 15 therein, and to receive the attachment end 22 of the other jaw 20. The housing 14 preferably includes an opening 19 formed in one end thereof and communicating with the passage 15 thereof to receive the attachment end 22 of the other jaw 20.

In operation, as shown in FIGS. 3–5, the housing 14 may be used to shield the attachment end 22 of the other jaw 20 and the pawl 30, and to prevent the pawl 30 from being moved relative to the jaws 10, 20, and to prevent the catch 31 from being disengaged from the teeth 13 of the jaw 10, and thus to prevent the jaws 10, 20 from being disengaged from each other inadvertently.

Accordingly, the clamping device in accordance with the present invention includes an arrangement or a configuration to stably and solidly clamp and store bundled items, cables, electrical cords, or the like therein.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A clamping device comprising:

a first jaw and a second jaw each including a hinge end and a distal attachment end, said hinge ends of said first and said second jaws being pivotally secured together with a pivot shaft, said attachment end of said first jaw including a plurality of teeth provided thereon, and including a housing secured thereon and having a passage formed therein to receive said attachment end of said second jaw, said attachment end of said second jaw including a pawl having a middle portion pivotally attached thereto with a pivot pin, said pawl including a first end having a catch provided thereon to engage with either of said teeth of said first jaw, and to detachably secure said attachment ends of said first and said second jaws together, and including a second end extended outward of said housing for being actuated to disengage said catch from said teeth of said first jaw, and means for biasing said catch of said pawl to engage with either of said teeth of said first jaw.

2. The clamping device as claimed in claim 1, wherein said attachment end of said second jaw includes a channel formed and defined between a pair of arms to receive said pawl in said channel of said attachment end of said second jaw.

3. The clamping device as claimed in claim 1, wherein said biasing means includes a spring engaged on said pivot pin, and having two ends engaged with said second jaw and said pawl respectively.

4. The clamping device as claimed in claim 1, wherein said first jaw includes a fastener engaged through said housing and said attachment end of said first jaw, to secure said attachment end of said first jaw and said housing together.

5. The clamping device as claimed in claim 1, wherein said housing includes an opening formed therein and communicating with said passage thereof to receive said attachment end of said second jaw.

\* \* \* \* \*